United States Patent
Beatty et al.

(10) Patent No.: US 9,802,277 B2
(45) Date of Patent: Oct. 31, 2017

(54) TANK WELDING FIXTURE

(71) Applicant: Lincoln Global, Inc., City of Industry, CA (US)

(72) Inventors: Johnny W. Beatty, Madison, OH (US); Travis G. Whitworth, Rossville, GA (US); Michael Whan, Hiram, OH (US); Brian Simons, Mentor, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 70 days.

(21) Appl. No.: 14/705,089

(22) Filed: May 6, 2015

(65) Prior Publication Data

US 2016/0016267 A1    Jan. 21, 2016

Related U.S. Application Data (60) Provisional application No. 62/026,083, filed on Jul. 18, 2014.

(51) Int. Cl.
*B23K 37/053* (2006.01)
*B23K 37/04* (2006.01)

(52) U.S. Cl.
CPC ...... *B23K 37/0538* (2013.01); *B23K 37/0452* (2013.01)

(58) Field of Classification Search
None
See application file for complete search history.

(56) References Cited

U.S. PATENT DOCUMENTS

| | | | | |
|---|---|---|---|---|
| 2,500,204 A | * | 3/1950 | Ronay | B23K 37/053 228/44.5 |
| 3,014,121 A | * | 12/1961 | Thomas | B23K 37/04 219/159 |
| 3,699,639 A | * | 10/1972 | Ditto | B23K 37/08 156/73.5 |
| 3,711,933 A | * | 1/1973 | Herdman | B21D 51/18 29/431 |

(Continued)

FOREIGN PATENT DOCUMENTS

| | | | |
|---|---|---|---|
| CN | 202212736 U | * | 5/2012 |
| CN | 202622271 U | | 12/2012 |

(Continued)

OTHER PUBLICATIONS

Jetline engineering, "Circumferential Welders", Mar. 2014, product brochure and manual, p. 1-35.*

(Continued)

*Primary Examiner* — Devang R Patel
(74) *Attorney, Agent, or Firm* — Brad C. Spencer (57) ABSTRACT

A welding fixture and method allow for both coarse and fine adjustments of headstocks and tailstocks for securing a tank or other cylindrical-like object within a welding fixture. Coarse adjustment is provided by adjusting the headstock and/or tailstock linearly along a rail system. Find adjustment is provided by linearly adjusting a movable table on which the headstock and/or tailstock rest. The headstock and tailstock may also have compression clamping members for securing the tank to the headstock and tailstock. Pipe stands are also provided for supporting the tank before, during, and after the welding process.

14 Claims, 9 Drawing Sheets

(56) References Cited

U.S. PATENT DOCUMENTS

| | | | |
|---|---|---|---|
| 3,802,277 A | | 4/1974 | Pandjiris |
| 3,963,231 A | * | 6/1976 | Cooper ............... B23K 37/0538 269/130 |
| 4,577,089 A | * | 3/1986 | Olson .................... B23K 7/102 219/124.22 |
| 4,629,109 A | * | 12/1986 | Matsushita .......... B23K 37/053 228/32 |
| 5,220,178 A | * | 6/1993 | Dreiling ............. G01N 21/8914 250/559.03 |
| 6,942,139 B2 | * | 9/2005 | Lipnevicius ......... B23K 9/0216 228/102 |
| 2004/0056400 A1 | * | 3/2004 | Ghuman ............... B23P 21/004 269/71 |
| 2006/0091598 A1 | * | 5/2006 | Wong ..................... B23K 37/04 269/45 |
| 2009/0206146 A1 | * | 8/2009 | Yamaoka ............. B23K 9/0026 228/44.3 |

FOREIGN PATENT DOCUMENTS

| | | | |
|---|---|---|---|
| CN | 103317282 A | | 9/2013 |
| CN | 203380544 U | | 1/2014 |
| CN | 103658930 A | | 3/2014 |
| CN | 203592232 U | * | 5/2014 |

OTHER PUBLICATIONS

"System for Welding Cylinders—Seamer", website can be found at http://www.pandjiris.com/assets/pdf/13092.pdf, accessed on Oct. 2, 2014.

"Mechanical Automated Circumferential Seam Welding", website can be found at http://www.forster-welding-systems.com/en/automation/circumferential-seam-welding.html, accessed on Oct. 2, 2014.

"Circumferential Weld Fixtures", website can be found at http://www.jetline.com/product.aspx?i=14479&c=38&pp=8&sb=0&p=0, accessed on Oct. 2, 2014.

"CWL 30 & 36 Circumferential Welding Lathe", website can be found at http://www.weldlogic.com/downloads/CWL-30&36.pdf, accessed on Oct. 2, 2014.

"Welding Positioner Model 504", website can be found at http://www.allfabcorp.com/model_504.htm, accessed on Oct. 2, 2014.

* cited by examiner

TANK WELDING FIXTURE

CROSS-REFERENCE TO RELATED APPLICATIONS

This application claims priority to U.S. Provisional Application Ser. No. 62/026,083, filed on Jul. 18, 2014, entitled "TANK WELDING FIXTURE", the entirety of which is incorporated herein by reference.

BACKGROUND OF THE INVENTION

The present disclosure relates to welding fixtures. In particular, fixtures for supporting generally cylindrical objects during welding. Examples of such cylindrical objects include tanks, pressure vessels, and the like.

Currently, tanks and other similar cylindrical objects can be formed by using robotic welding arms with the tank or object held in a welding fixture. The robotic welding arm may move to desired coordinates, while the tank may be rotated about its length in the fixture. Given this configuration, the robotic arm is able to reach and weld any necessary locations. However, such fixtures are not able to easily and appropriately account for variations in diameters and lengths of tanks, for example, within design specifications. Accordingly, the tanks may not be safely held within the fixture, or fitting the tank within the fixture may take additional time.

SUMMARY OF THE INVENTION

According to one example of a welding fixture described herein, a welding fixture comprises a headstock attached to a first support, the headstock comprising a first compression clamping member; a tailstock attached to a second support, the tailstock comprising a second compression clamping member; a movable table driven by a linear actuator, the movable table being attached between the headstock and the first support or between the tailstock and the second support; and a rail system, wherein the first support and/or second support are movable along the rail system and can be locked at fixed positions along the rail system, and wherein a position of the headstock or tailstock is adjustable by the linear actuator to cause at least one of the first compression clamping member and the second compression clamping member to contact and secure an object to be welded.

In various embodiments of the above example, the linear actuator comprises at least one of a leadscrew operated by a hand crank, a motor, a pneumatic pump, and a hydraulic pump; the rail system is a rail-within-a-rail system; at least one of the first compression clamping member and second compression clamping member is spring biased; the welding fixture further comprises a second linear actuator that moves at least one of the first support and the second support along the rail system; the first support is attached to a first trolley member and the second support is attached to a second trolley member, and the first and second trolley members are each attached to at least one bearing element that moves along the rail system; and/or the welding fixture further comprises at least one vertically adjustable pipe stand that is movable along the rail system between the headstock and tailstock, the pipe stand being movable along the rail system via at least one trolley member, and being lockable at fixed positions along the rail system.

According to another example, a welding fixture comprises a headstock attached to a first support, the headstock comprising a first compression clamping member; a tailstock attached to a second support, the tailstock comprising a second compression clamping member; a linear actuator; and a rail system extending along an axis having at least one trolley member, wherein the first support and/or second support are attached to the at least one trolley member, the trolley member being movable along the rail system and lockable at fixed positions along the rail system, and wherein a position of the headstock or tailstock is adjustable by the linear actuator in direction parallel to the axis to cause at least one of the first compression clamping member and the second compression clamping member to contact and secure an object to be welded.

In various embodiments of the above example, the linear actuator comprises at least one of a leadscrew operated by a hand crank, a motor, a pneumatic pump, and a hydraulic pump; the rail system is a rail-within-a-rail system; at least one of the first compression clamping member and second compression clamping member is spring biased; the welding fixture further comprises a second linear actuator that moves the at least one trolley member along the rail system; and/or the welding fixture further comprises at least one vertically adjustable pipe stand that is movable along the rail system between the headstock and tailstock, the pipe stand being movable along the rail system via at least one trolley member, and being lockable at fixed positions along the rail system.

According to yet another example, a method for welding comprises placing an object to be welded on at least one vertically adjustable pipe stand, the vertically adjustable pipe stand being movable along a rail system between a headstock and a tailstock; linearly adjusting at least one of the headstock and the tailstock along an axis to coarsely adjust the distance between the headstock and the tailstock to match the length of the object, the headstock and the tailstock being attached to at least one trolley member, the trolley member being movable along the rail system; securing the at least one trolley member at a location along the rail system; linearly adjusting a moveable table on at least one of the headstock and the tailstock relative to the at least one trolley member to finely adjust the distance between the headstock and the tailstock to match the length of the object; and lowering the at least one vertically adjustable pipe stand, wherein the coarse adjustment or fine adjustment causes at least one compression clamping member on each of the headstock and the tailstock to secure the object to be welded to the headstock and the tailstock.

In various embodiments of the above example, after welding has been completed, the method further comprises: raising the at least one vertically adjustable pipe stand to support the object; linearly adjusting the movable table on at least one of the headstock and the tailstock to finely increase the distance between the headstock and the tailstock; and linearly adjusting at least one of the headstock and the tailstock along the rail system to coarsely increase the distance between the headstock and the tailstock, wherein the coarse adjustment or fine adjustment causes at least one compression clamping member on each of the headstock and the tailstock to release the object to be welded from the headstock and the tailstock; the moveable table is linearly adjusted by at least one of a leadscrew operated by a hand crank, a motor, a pneumatic pump, and a hydraulic pump; the rail system is a rail-within-a-rail system; at least one of the first compression clamping member and the second compression clamping member is spring biased; the at least one trolley member attached to the headstock and/or the tailstock is linearly adjusted along the rail system by a linear actuator; and/or the pipe stand is movable along the rail system via at least one bearing element, and can be locked at fixed positions along the rail system.

DETAILED DESCRIPTION

Figure 1:
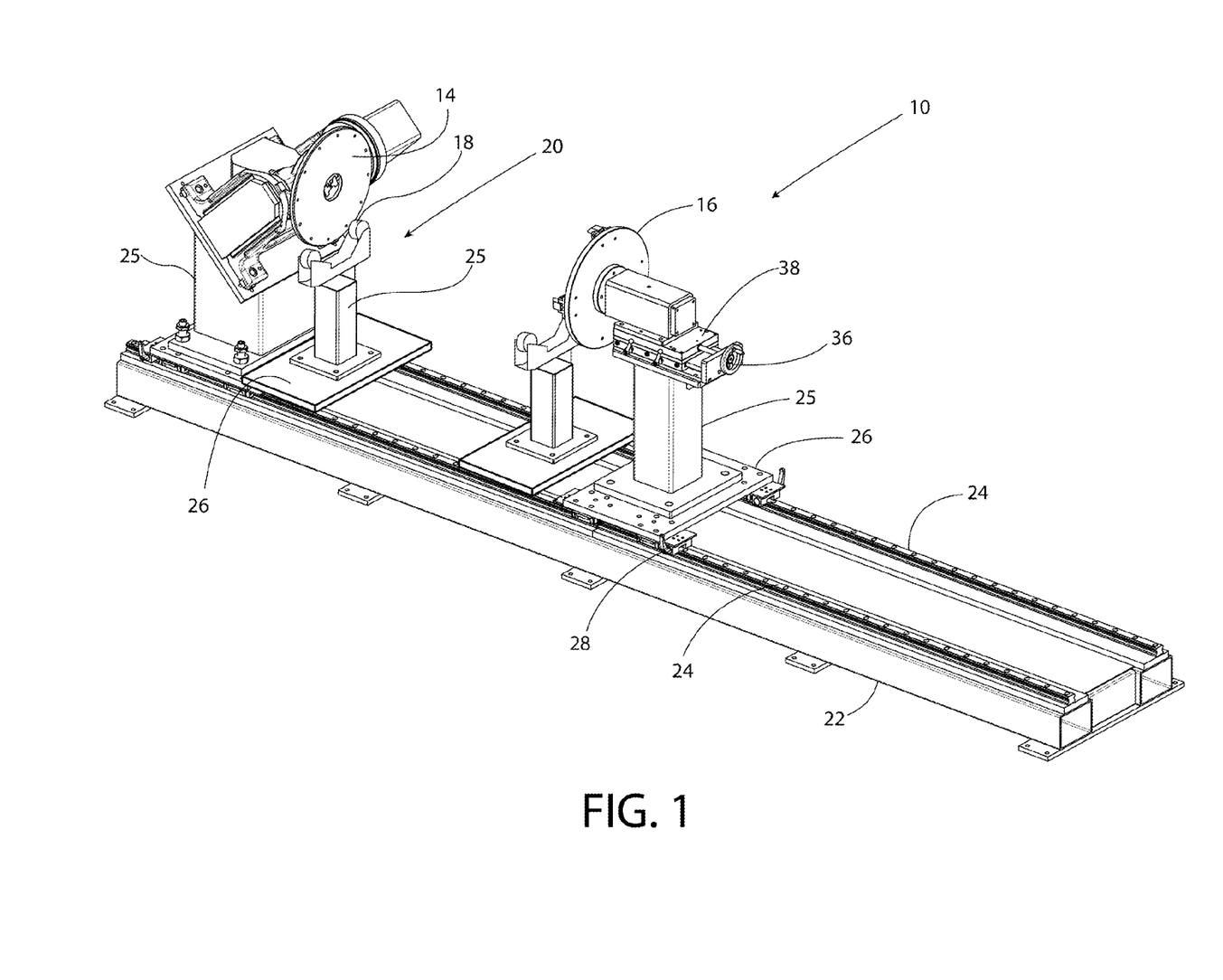
FIG. 1 is a perspective view of an example welding fixture.
Figure 2:
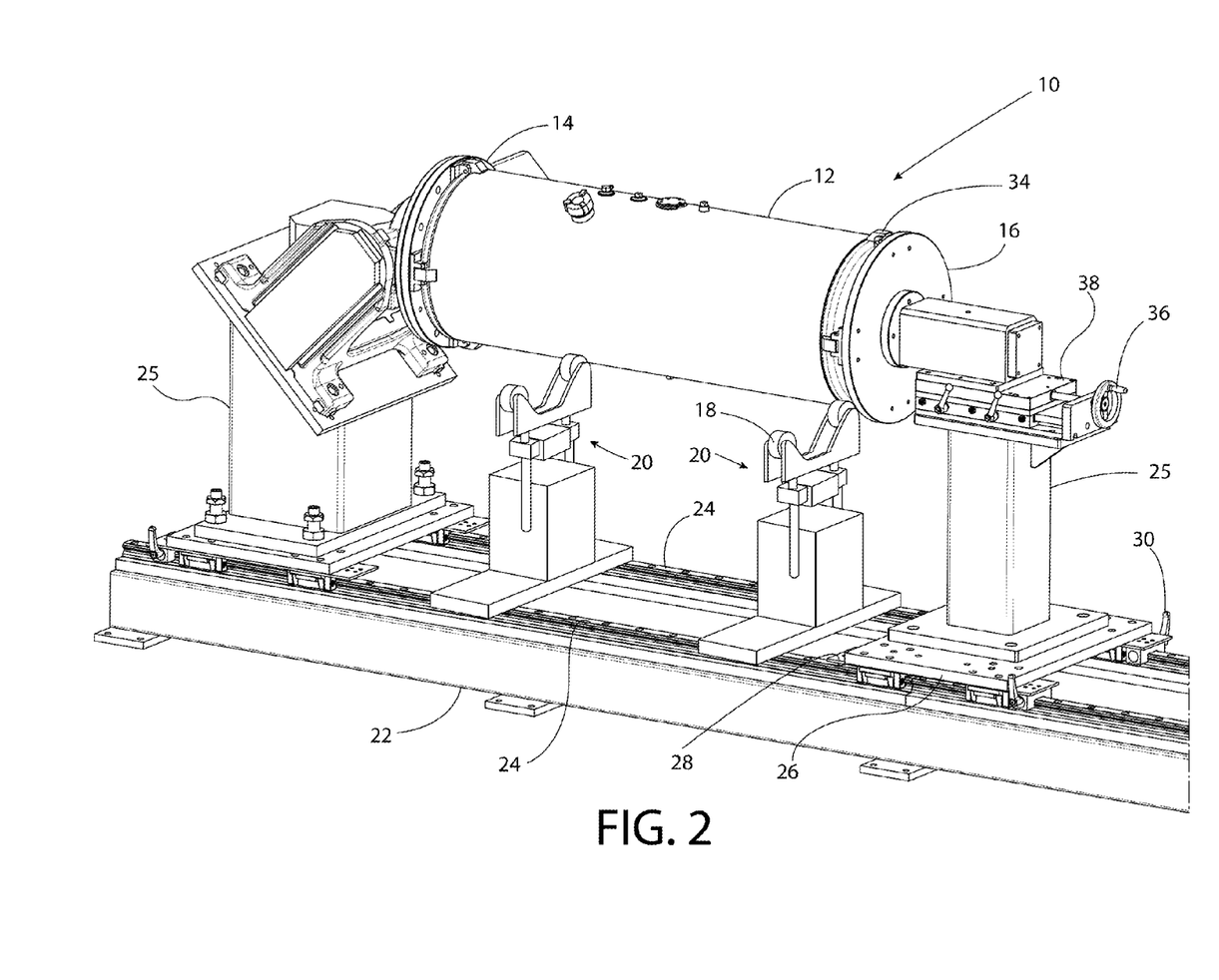
FIG. 2 is a perspective view of an example welding fixture.

Turning now to a description of the figures, FIGS. 1-4 show an example welding fixture 10. The welding fixture 10 is configured to support a generally cylindrical object, such as a tank, pressure vessel, or the like, during a welding operation. FIG. 1 shows the welding fixture 10 with no object present, whereas FIG. 2 shows a similar view of the welding fixture 10 while supporting a tank 12. While the welding fixture 10 is generally described herein with respect to a tank, it should be noted that this not intended to be a limiting feature and that the welding fixture 10 may be used with any generally cylindrical object. The welding fixture 10 includes a headstock 14, a tailstock 16, and one or more pipe stands 20 for supporting the tank 12. The pipe stands 20 can be used to support the tank 12 prior to, during, and/or subsequent to a welding operation. The pipe stands 20 can include a roller head 18 having, for example, roller bearings, that allow the tank 12 to rotate within the welding fixture 10 and center itself within the fixture.

The welding fixture 10 is designed to accommodate tanks of varying lengths. Accordingly, the headstock 14, tailstock 16, and pipe stands 20 are linearly movable or positionable along a base 22 of the welding fixture 10. The base 22 can be formed from steel (e.g., square steel tubing) and/or other appropriate structural materials, and can include rails 24 mounted to the upper surfaces of the tubing. The rails 24 may include indentations in their inner and outer sides, such that each side forms a squared U-shaped cross-section. Supports 25 for the headstock 14, tailstock 16, and pipe stands 20 are movable along the rails 24 on the base 22. The supports 25 for the headstock 14, tailstock 16, and pipe stands 20 can include trolley members 26 that ride along the rails 24 and allow the headstock, tailstock, and pipe stands 20 to be linearly positioned as desired.

The trolley members 26 include one or more bearing elements 28 that allow the trolley members to move along the rails 24. The trolley members 26 have at least one bearing element 28 at each rail 24. However, the trolley members 26 can include multiple bearing elements 28 if desired. For example, the trolley members 26 can have a separate bearing element 28 located at each of four corners of the trolley member. Each bearing element 28 may contact the rails 24 in the indentations of the rails 24, for example, along the indentations in the inner and outer sides of the rails 24. In this way, the bearing elements 28 may be held against the rails 24 and be provided additional surface area in which to provide a smoother rolling surface. The supports 25 for the headstock 14, tailstock 16, and pipe stands 20 can be manually movable along the rails 24, or can be power driven, such as by a motor or drive chain (not shown).

In certain embodiments, the position of the headstock 14 is fixed, and only the tailstock 16 and pipe stands 20 are movable along the rails 24. Alternatively, the position of the tailstock 16 can be fixed, with only the headstock 14 and pipe stands 20 movable along the rails 24. In still other embodiments, the positions of both the headstock 14 and tailstock 16 may be movable along the rails 24.

FIGS. 1 and 2 show a welding fixture 10 having two pipe stands 20. However, is to be appreciated that, depending on the size of the tank 12 to be welded, the welding fixture 10 can include fewer than two pipe stands 20 (e.g., zero or one), or more than two pipe stands 20.

The linear positions of the headstock 14, tailstock 16, and pipe stands 20 along the rails 24 can be fixed via a locking mechanism, such as a clamp 30. When the headstock 14, tailstock 16 or a pipe stand 20 is moved to a desired position along the rails 24, the clamp can be operated to lock the headstock 14, tailstock 16, or pipe stand 20 at that position along the rails 24. The clamp 30 can have a lever for manually locking the headstock 14, tailstock 16 and pipe stands 20 in place, or the clamp can be powered (e.g., a hydraulic or pneumatic brake). In an example embodiment, the rails 24 include a plurality of positioning holes along their top, as shown in FIGS. 1 and 2, and the clamp 30 includes one or more movable pins that are driven into a desired positioning hole upon operation of the clamp 30, to lock the headstock 14, tailstock 16 or pipe stand 20 in place. In other embodiments, the clamp 30 may similarly tighten the bearing elements into the indentations in the rails 24. Additionally, the holes may be located on the inner and/or outer sides of the rails 24, rather than on the top.

Figure 3:
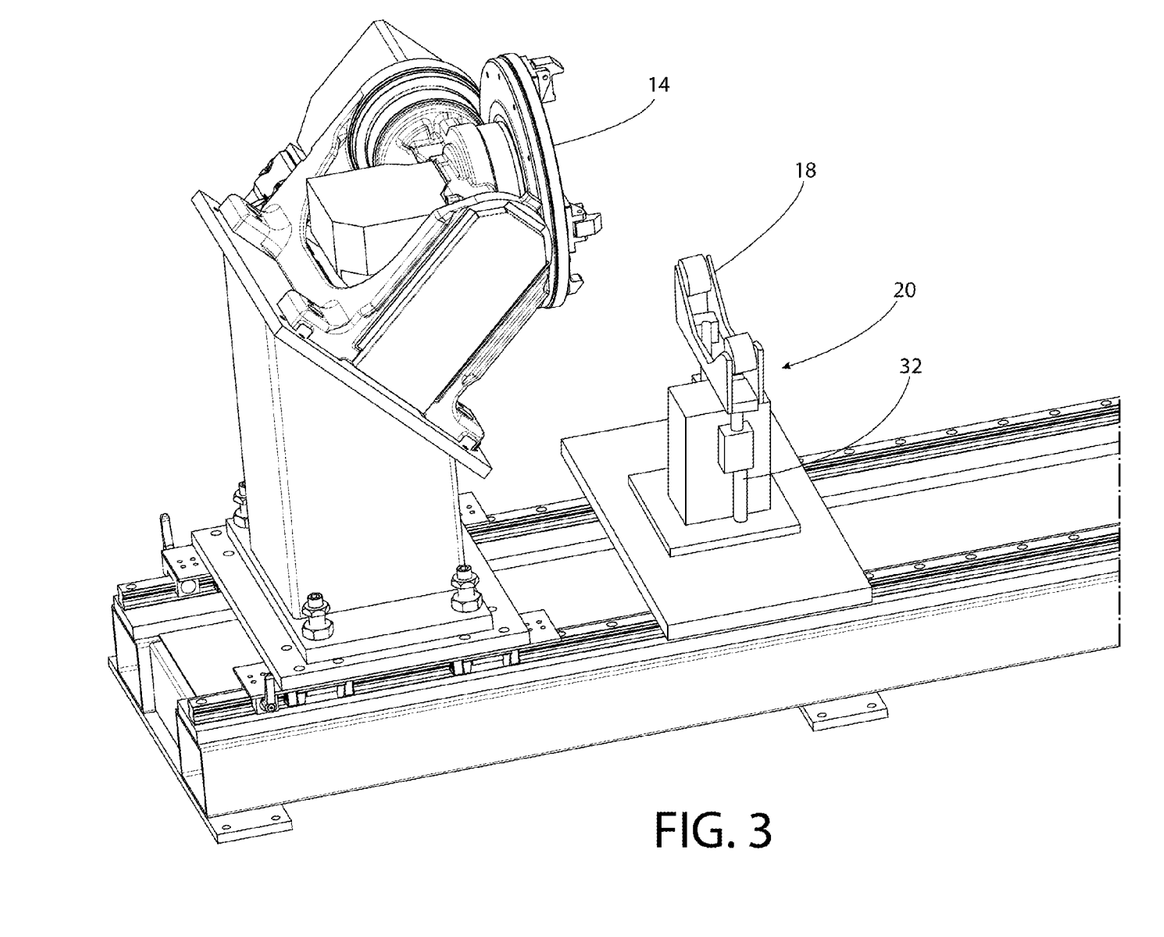
FIG. 3 is a partial perspective view of an example welding fixture.
Figure 4:
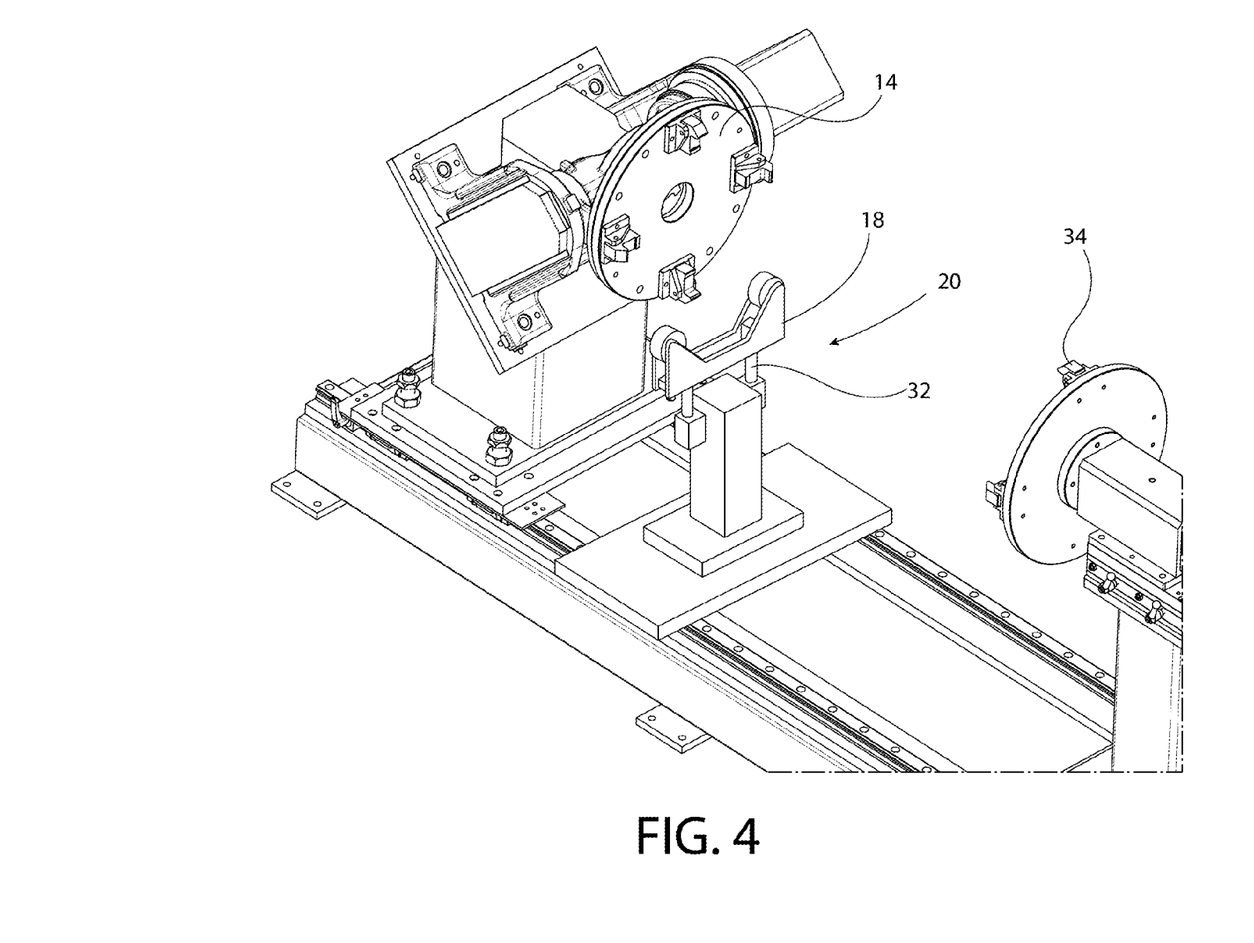
FIG. 4 is a partial perspective view of an example welding fixture.

In addition to being linearly movable along the rails 24, the pipe stands 20 can be vertically positionable to accommodate tanks 12 of varying diameter. In particular, the roller head 18 of the pipe stands 20 can be moved upward and downward with respect to its support 25 to accommodate various tank diameters. In an example embodiment, as best seen in FIGS. 3 and 4, the pipe stands 20 can include mounting posts 32 that allow the roller head 18 to be mounted at various heights with respect to the support 25. For example, the mounting posts 32 can have a plurality of holes or other suitable mounting structure arranged linearly along the posts that allow the posts to be secured to their support at a desired elevation. In embodiments where finer adjustments are required, the mounting posts 32 may be held in place, for example, with set pins or similar clamps that are not dependent on particular hole locations.

The pipe stands 20 may be used to only to support the tank 12 before and after the welding operation. That is, the tank 12 may be supported only by the headstock 14 and tailstock 16 during the welding operation. For example, the pipe stands 20 can be used to support the tank 12 while it is clamped between the headstock 14 and the tailstock 16 prior to welding, and while the tank 12 is released from the headstock 14 and tailstock 16 after welding. After the tank 12 is securely clamped between the headstock 14 and the tailstock 16, the roller heads 18 of the pipe stands 20 can be lowered away from the tank 12, and welding can commence. After welding, the roller heads 18 can be raised to support the tank 12 again, so that it can be released from the headstock 14 and tailstock 16. The roller heads 18 can be manually movable or powered, such as by electric motors or hydraulic or pneumatic actuators.

The headstock 14 is configured to apply torque to the tank 12, to cause the tank 12 to rotate (e.g., during welding). The headstock 14 can include a motor and appropriate gearing, electronic drives, axles, and the like to rotate the tank 12 about an axis of rotation at a desired speed or speeds.

The headstock 14 and tailstock 16 can include a plurality of clamping members 34 that grab onto the ends of the tank 12, to hold the tank 12 during welding and keep the tank 12 centered with respect to its axis of rotation. The clamping members 34 can be configured to automatically clamp down onto the tank 12 when the headstock 14 and/or tailstock 16 is pushed against the end of the tank 12. For example, the clamping members 34 can include pivoting, spring-biased fingers 66 that are forced to clamp onto the tank 12 when a compression force is applied to the tank 12 by the headstock 14 and the tailstock 16. The fingers 66 are biased by a spring to normally pivot away from the tank 12. The bias force is overcome when the headstock 14 or tailstock 16 is pressed against an end of the tank 12, causing the finger to clamp onto the tank 12. When the compression force is released, such as when the headstock 14 and/or tailstock 16 is moved away from the tank 12, the bias force applied by the springs causes the fingers 66 to release their grip on the tank 12. In certain embodiments, the clamping members 34 can be linearly movable to accommodate tanks of varying diameter. For example, the clamping members 34 can be moved radially toward and away from the rotation axis of the headstock 14 and tailstock 16, to accommodate different tank diameters.

The headstock 14 and tailstock 16 can include respective linear actuators 36 for finely positioning the headstock/tailstock 14, 16, horizontally with respect to the tank 12. For example, the headstock 14 and tailstock 16 can include movable tables 38 that are driven toward and away from the tank 12 by the linear actuators 36. Example linear actuators include leadscrews, ball screws, hydraulic actuators, and the like. The movable table 38 driven by the linear actuator 36 can be in the form of a dovetail slide. The supports 25 for the headstock 14 and tailstock 16 can provide a coarse linear adjustment or positioning of the headstock 14 and tailstock 16 along the rails 24 and with respect to the tank 12, while the linear actuators 36 and movable tables 38 can provide a fine linear adjustment. The fine linear adjustment can allow for the accommodation of tanks having slightly varying lengths, due to manufacturing tolerances for example. In certain embodiments, only one of the headstock 14 and tailstock 16 includes the movable table 38 and, thus, the fine linear adjustment is made only at said one of the headstock 14 and the tailstock 16. For example, the movable table 38 can be provided only at the tailstock 16, with the headstock 14 lacking a movable table 38 and actuator 36. However, in other embodiments, both the headstock 14 and tailstock 16 may have a movable table 38.

An example process for mounting the tank 12 within the welding fixture 10 will be described. Pipe stands 20 are added or removed from the welding fixture 10, depending on the size of the tank 12 to be welded. For example, pipe stands 20 and corresponding trolley members can be bolted to bearing elements 28 on the rails 24. The headstock 14 (if movable), tailstock 16 (if movable), and pipe stands 20 can be moved along the rails 24 to desired positions and then locked into place via their respective locking mechanisms. The roller heads 18 of the pipe stands 20 can be vertically adjusted and, if necessary, the clamping members 34 of the headstock 14 and tailstock 16 can be radially adjusted, toward or away from the rotation axis of the headstock/tailstock. The tank 12 is then placed in the welding fixture, in particular onto the pipe stands 20, using a crane for example. The position of the headstock 14 and/or tailstock 16 with respect to the tank 12 can be adjusted if desired.

Prior to welding, when the tank 12 is placed onto the welding fixture 10, the tank 12 typically includes three major components: a cylindrical wrap or shell formed from sheet metal, a head cap closing one end of the shell, and an end cap closing the other end of the shell. The longitudinal seam of the shell is typically tack welded before final welding in the welding fixture 10. Similarly, the head and end caps are typically tack welded to the shell before final welding in the welding fixture 10. The tank 12 can include additional, minor components, such as fittings and the like, that can be welded to the shell while the tank 12 is in the welding fixture 10. Such minor components can be tack welded to the shell prior to placing the tank 12 into the fixture 10, or can be added during final welding within the fixture 10.

After the tank 12 is set onto the pipe stands 20, the headstock 14 and tailstock 16 can be finely positioned with respect to the tank 12 using the linear actuators 36. For example, an operator can turn a crank on the linear actuator 36 to drive the movable table 38 of the headstock/tailstock toward the head or end cap of the tank 12. As the headstock/tailstock 14, 16 engages the head cap or end cap of the tank 12, the clamping members 34 on the headstock/tailstock clamp down onto the tank 12. With the tank 12 thus clamped between the headstock 14 and the tailstock 16, the roller heads 18 of the pipe stands 20 can be lowered away from the tank 12, if desired. The tank 12, now clamped between the headstock 14 and tailstock 16, can be rotated by the headstock during welding. After welding is completed, the operator can release the tank 12 by raising the roller heads 18 of the pipe stands 20 and reversing the operation of the linear actuators 36 and/or unlocking the locking mechanisms holding the headstock 14 and tailstock 16 in place on the frame 22.

In certain embodiments, the rails 24 themselves are linearly positionable along the base 22 of the welding fixture 10. For example, the rails 24 can each be outer rails of a rail-within-a-rail system. In a rail-within-a-rail system, the outer rail can be moved along an inner rail on bearings or rollers located between the rails 24. The inner rails are fixed to the base 22, allowing the outer rails to be moved linearly along the base 22. The rails 24 can be selectively locked together to prevent relative movement between the rails 24, and unlocked so that the outer rail can be moved along the inner rail. A rail-within-a-rail system can allow the tank 12 to be mounted between the headstock 14 and the tailstock 16, and the tank 12, headstock 14 and tailstock 16 moved together to correctly position the tank 12 for welding. A rail-within-a-rail system can be used to help properly position the tank 12 with respect to a robotic welding torch prior to welding.

Figure 5:
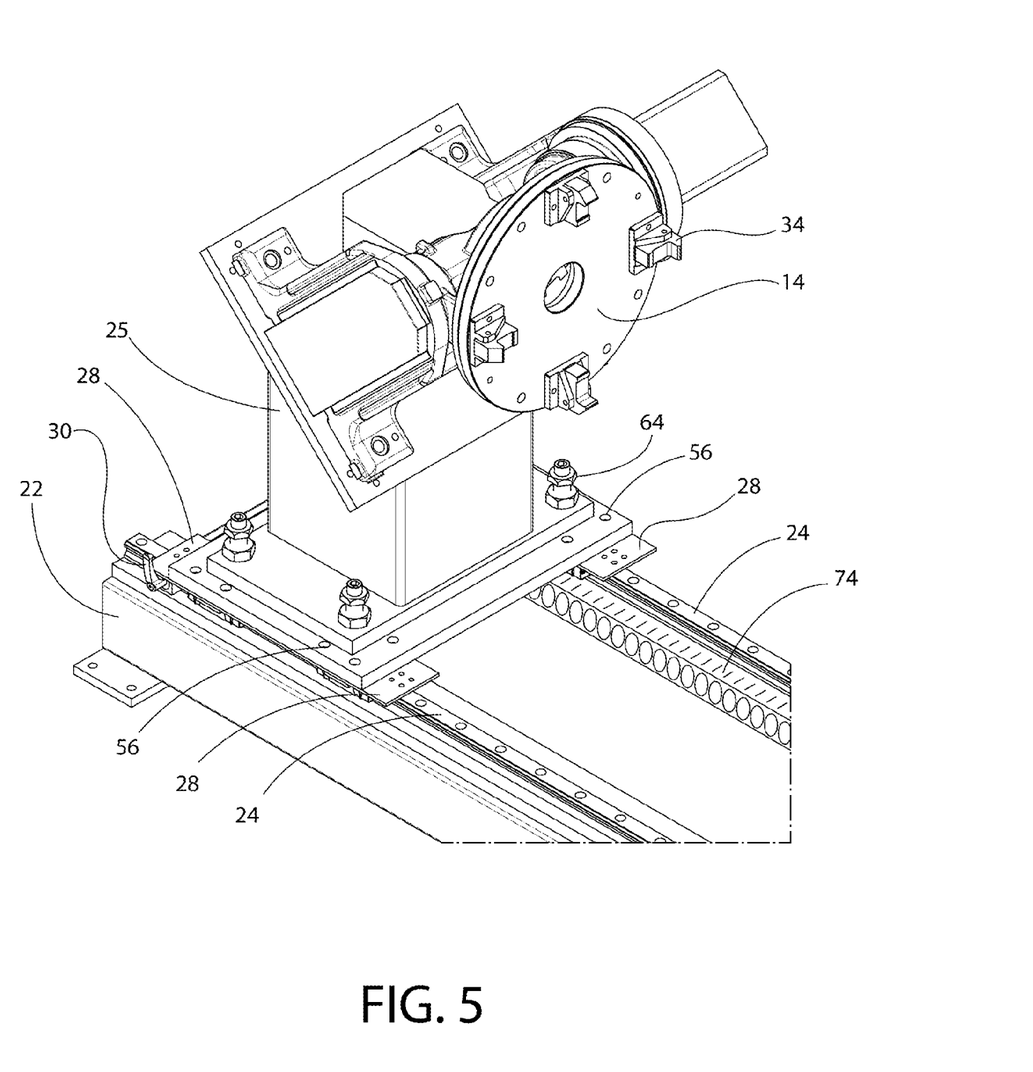
FIG. 5 is a partial perspective view of an example support, trolley member, and rails of a headstock.
Figure 6:
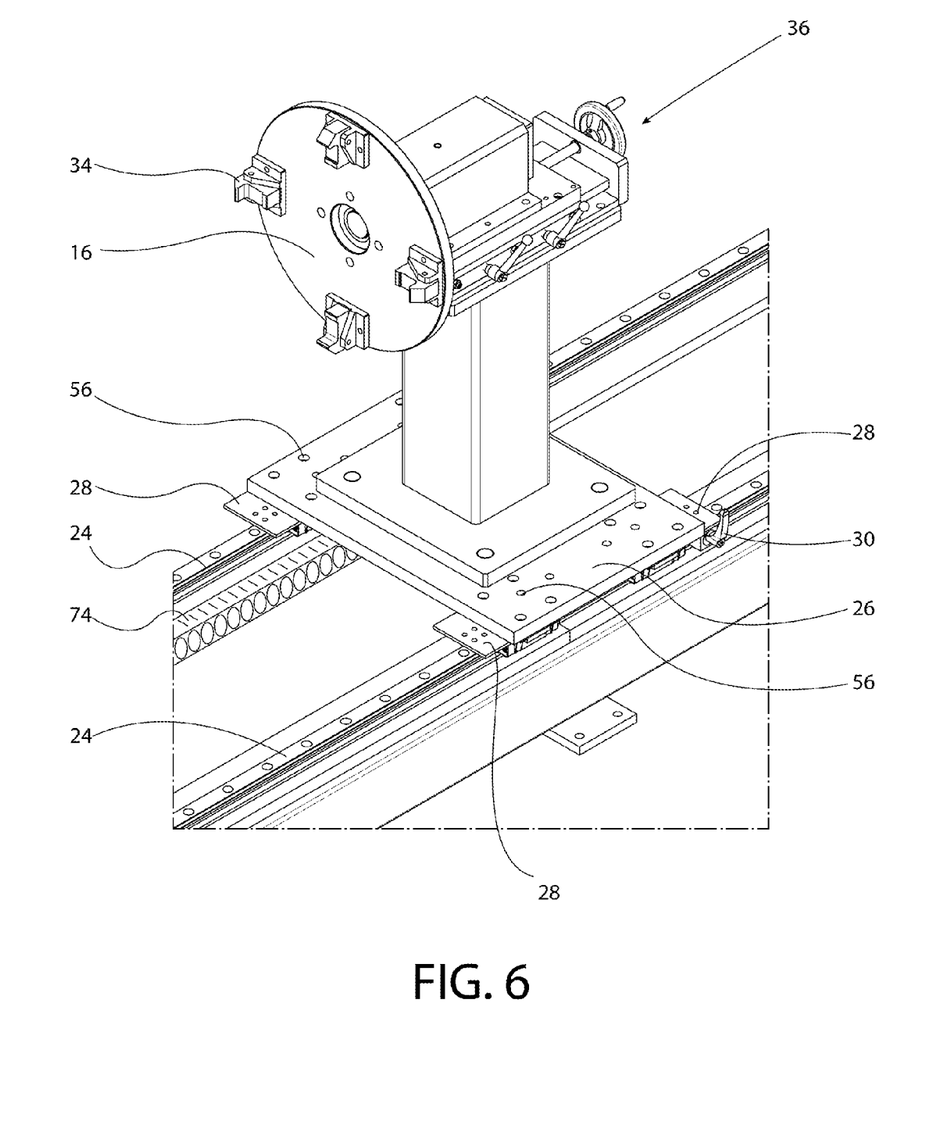
FIG. 6 is a partial perspective view of an example support, trolley member, and rails of a tailstock.

FIGS. 5 and 6 illustrate an example support 25 for a headstock 14, mounted to the rails 24 on the base 22, and an example support 25 for a tailstock 16 mounted to the rails 24 on the base 22, respectively. Bearing elements 28 that allow the support 25 to move along the rails 24 can be seen between the support 25 and the rails 24. The support 25 is bolted 64 to a trolley member 26 that is movable along the rails 24 on bearing elements 28. Similarly, bolts/bolt holes 56 can be used to secure the trolley member 26 to the bearing elements 28. A track 74 may connect the supports 25 for the headstock 14 and tailstock 16 to further help control the distance between the headstock 14 and tailstock 16, for example, by preventing the distance from becoming too great. The clamp 30 for locking the position of the headstock 14 and tailstock 16 along the rails 24 can also be seen. The headstock 14 is shown oriented at a 45° angle with respect to the support 25, with clamping members 34. The headstock 14 can be mounted at other angles with respect to the support 25, such as 90° for example, depending on the design of the headstock 14.

Figure 7:
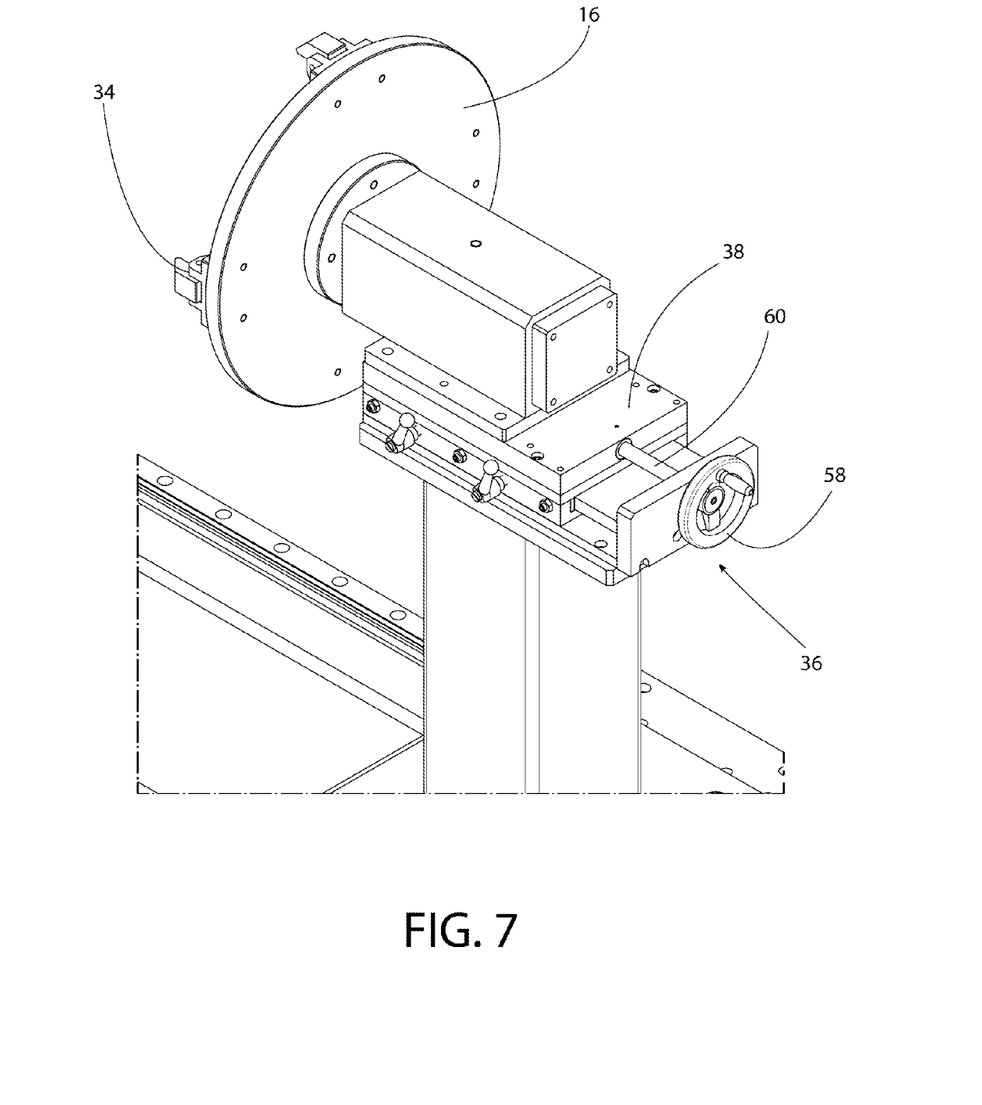
FIG. 7 is an illustration of a portion of an example welding fixture.

FIG. 7 provides a close up view of the tailstock 16. A movable table 38 and linear actuator 36, including a leadscrew 60 and crank 58, are illustrated. As the crank 58 is turned to actuate the leadscrew 60, the movable table 38 is adjusted along a horizontal position. As discussed above, the linear actuator 36 may also take the form of a hydraulic, pneumatic, or similar actuator. Rather than a crank, a motor may be used to power movement of the movable table 38.

Figure 8:
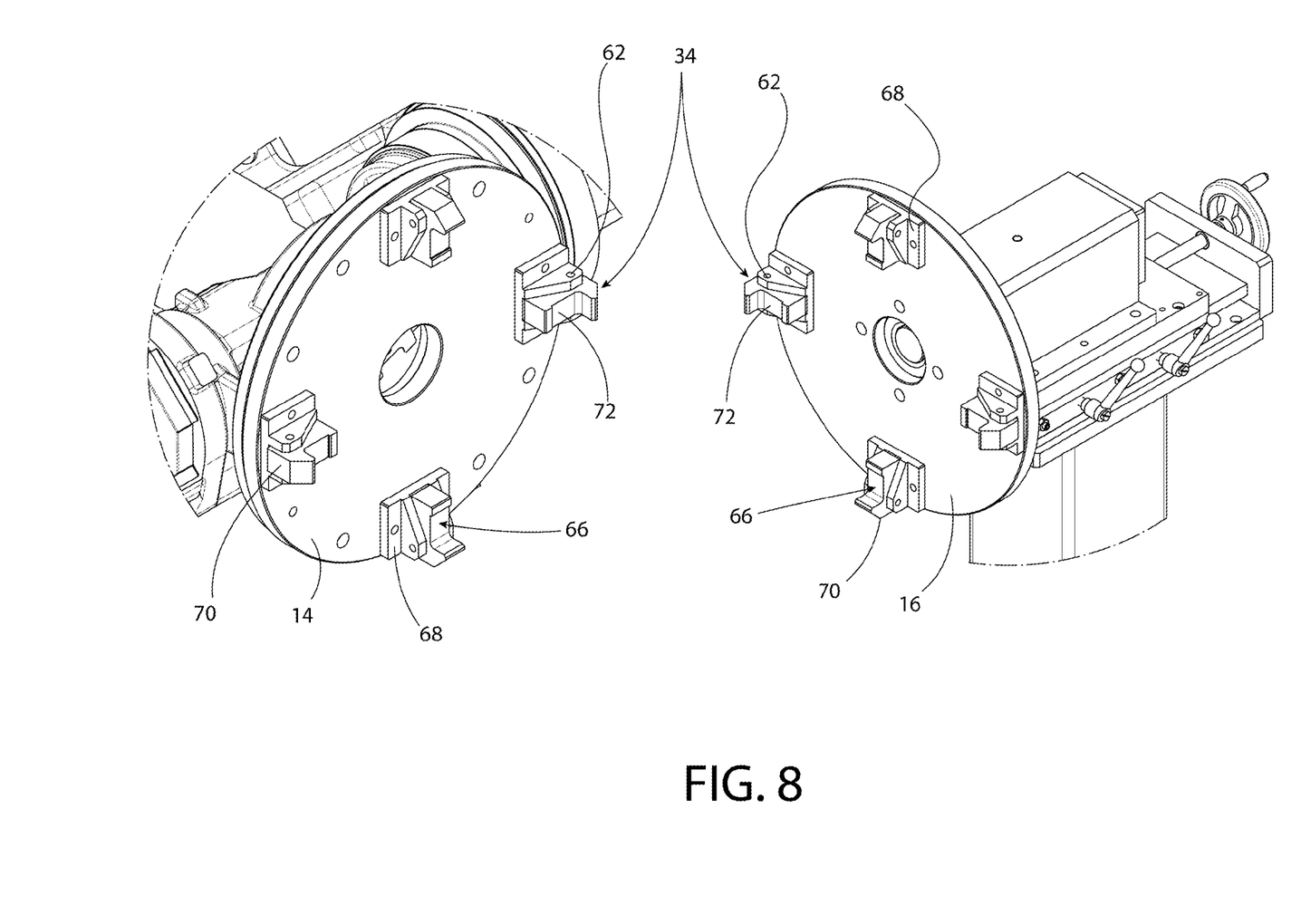
FIG. 8 is a perspective view of an example headstock and tailstock with compression clamping members.

The clamping members 34 on the headstock 14 and tailstock 16 can be seen in FIG. 8. The spring-biased fingers 66 on the clamping members can be generally L-shaped and are pivotally connected to a clamp base 68, which is mounted to the headstock 14 or tailstock 16. The spring-biased fingers 66 have a short "leg" 70 that projects outward and generally perpendicular from a finger main body 72. The finger main body 72 is mounted to the clamp base 68, for example, with a bolt 62 such that the finger 66 can pivot within the base 68. The amount of pivoting of the finger 66 within the clamp base 68 is limited by the outward and inward ends of the finger main body 72 contacting the clamp base 68. In some embodiments, the bolt 62 fits within an elongated opening in the base 68 to provide radial movement toward and away from the axis of rotation of the tailstock/headstock 14, 16 by positioning the bolt 64 along the elongated opening 62.

A spring (not shown) is mounted between the finger main body 72 and the clamp base 68, to bias the fingers 66 so that the inward end of the finger main body 72 projects upward from the base 68. The short "leg" 70 or outward projection of the spring-biased finger 66 grabs onto the end of the tank 12 when the tank 12 is pressed against the finger main body 72, which causes the spring-biased finger 66 to pivot within the clamp base 68.

In certain embodiments, the welding fixture 10 can include static lasers to help an operator properly align and position the tank 12 prior to welding. For example, the welding fixture can include two static lasers oriented perpendicular to each other to aid in positioning the longitudinal seam of the tank 12 shell and a circumferential seam between the head or end cap and the shell.

Figure 9:
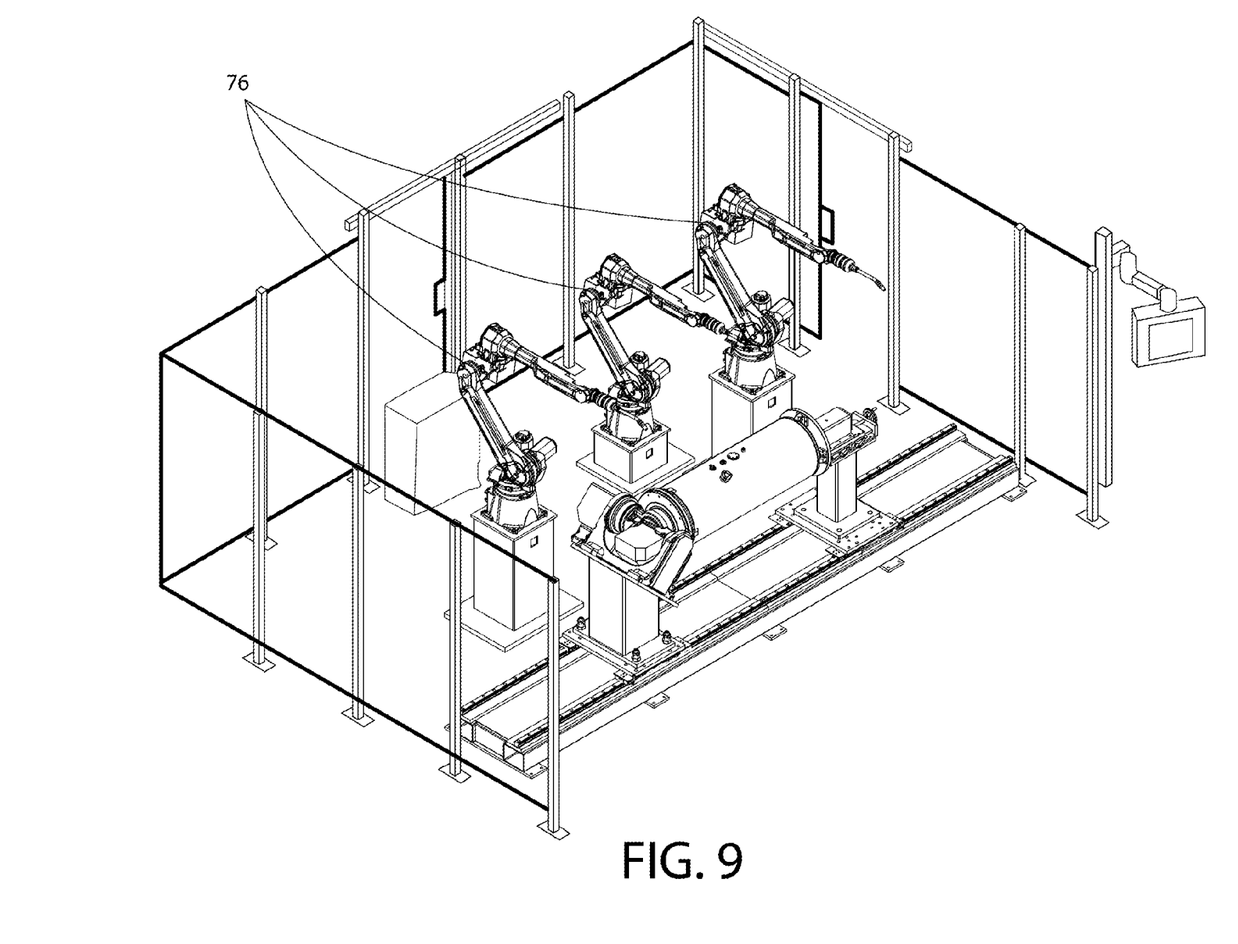
FIG. 9 is a perspective view of a welding fixture and robots.

It should be noted that the welding fixtures discussed herein can be used during manual welding operations or robotic welding operations. For example, as illustrated in FIG. 9, robots 76 used for robotic welding operations may include a plurality of arms and an arc welding torch mounted at the end of one of the arms. A welding power supply can be operatively connected to the welding torch. The robot can perform a welding operation on the tank 12, such as welding the longitudinal seam of the cylindrical wrap or shell, or welding the head and end caps to the wrap. Example welding operations that can be performed by the welding robot include gas metal arc welding (GMAW), flux-cored arc welding (FCAW), submerged arc welding (SAW) and the like. A wire feed motor may also be provided for supplying a consumable welding wire electrode to the torch.

Other robots 76 can have a tool for retrieving and placing minor components (fittings, etc.) onto the tank 12, for welding by another robot. These robots and/or the welding fixture 10 can include positioning devices, such as lasers, cameras, seam trackers, and the like, to aid in properly placing minor components on the tank 12, welding the tank 12, and welding minor components to the tank 12. The robots 76 and/or welding fixture 10 can also include parts recognition devices to identify minor components to be welded to the tank 12.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

We claim:

1. A welding fixture comprising:
a headstock attached to a first support, the headstock comprising a first compression clamping member;
a tailstock attached to a second support, the tailstock comprising a second compression clamping member;
a movable table driven for horizontal linear movement by a linear actuator, the movable table comprising a dovetail slide being attached between the headstock and the first support or between the tailstock and the second support; and
a rail system, wherein both of the first support and the second support are movable along the rail system and can be locked at fixed positions along the rail system, and
wherein a position of the headstock relative to the first support or a position of the tailstock relative to the second support is adjustable by the linear actuator horizontally moving said table, to cause at least one of the first compression clamping member and the second compression clamping member to contact and secure an object to be welded.

2. The welding fixture of claim 1, wherein the linear actuator comprises at least one of a leadscrew operated by a hand crank, a motor, a pneumatic pump, and a hydraulic pump.

3. The welding fixture of claim 1, wherein the rail system is a rail-within-a-rail system comprising an outer rail movable along an inner rail such that the headstock, the tailstock, and the object to be welded are moveable together with the outer rail.

4. The welding fixture of claim 1, wherein at least one of the first compression clamping member and second compression clamping member comprises a spring biased finger having a finger main body and a leg projecting outward from the finger main body, wherein the finger main body is pivotally connected to the headstock or tailstock and is movable between a gripping position and a release position, and wherein the spring biased finger is spring biased into the release position and contact of the object to be welded against the finger main body of the spring biased finger causes the spring biased finger to pivot to the gripping position and grip said object by the leg projecting outward from the finger main body.

5. The welding fixture of claim 1, further comprising a second linear actuator that moves at least one of the first support and the second support along the rail system.

6. The welding fixture of claim 1, wherein the first support is attached to a first trolley member and the second support is attached to a second trolley member, and the first and second trolley members are each attached to at least one bearing element that moves along the rail system.

7. The welding fixture of claim 1, further comprising at least one vertically adjustable pipe stand that is movable along the rail system between the headstock and tailstock, the pipe stand being movable along the rail system via at least one trolley member, and being lockable at fixed positions along the rail system.

8. A welding fixture comprising:
a headstock attached to a first support, the headstock comprising a first compression clamping member;
a tailstock attached to a second support, the tailstock comprising a second compression clamping member;
a linear actuator; and
a rail system extending along an axis having at least one trolley member,
wherein the first support and/or second support are attached to the at least one trolley member, the trolley member being movable along the rail system and lockable at fixed positions along the rail system,
wherein a position of the headstock relative to the first support or a position of the tailstock relative to the second support is adjustable by the linear actuator in a direction parallel to the axis to cause at least one of the first compression clamping member and the second compression clamping member to contact and secure an object to be welded, and
wherein at least one of the first compression clamping member and second compression clamping member comprises a spring biased, L-shaped finger having a finger main body and a leg projecting generally perpendicularly from the finger main body, wherein the spring-biased, L-shaped finger is pivotally mounted within an elongated opening of a clamp base, the clamp base being attached to the headstock or tailstock, and the spring-biased, L-shaped finger is movable between a gripping position and a release position.

9. The welding fixture of claim 8, wherein the linear actuator comprises at least one of a leadscrew operated by a hand crank, a motor, a pneumatic pump, and a hydraulic pump.

10. The welding fixture of claim 8, wherein the rail system is a rail-within-a-rail system comprising an outer rail movable along an inner rail such that the headstock, the tailstock, and the object to be welded are moveable together with the outer rail.

11. The welding fixture of claim 8, further comprising a second linear actuator that moves the at least one trolley member along the rail system.

12. The welding fixture of claim 8, further comprising at least one vertically adjustable pipe stand that is movable along the rail system between the headstock and tailstock, the pipe stand being movable along the rail system via at least one trolley member, and being lockable at fixed positions along the rail system.

13. The welding fixture of claim 12, wherein both of the first support and the second support are movable along the rail system and can be locked at fixed positions along the rail system.

14. The welding fixture of claim 8, further comprising a dovetail slide table operatively coupled to the linear actuator and one of the headstock and tailstock.

* * * * *